US012777129B2

(12) United States Patent
Sun et al.

(10) Patent No.: US 12,777,129 B2
(45) Date of Patent: Oct. 27, 2026

(54) VIDEO FRAME INTERPOLATION PROCESSING METHOD, VIDEO FRAME INTERPOLATION PROCESSING DEVICE, AND READABLE STORAGE MEDIUM

(71) Applicant: BOE TECHNOLOGY GROUP CO., LTD., Beijing (CN)

(72) Inventors: Mengdi Sun, Beijing (CN); Dan Zhu, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 336 days.

(21) Appl. No.: 18/560,891

(22) PCT Filed: Feb. 23, 2023

(86) PCT No.: PCT/CN2023/077905
§ 371 (c)(1),
(2) Date: Nov. 14, 2023

(87) PCT Pub. No.: WO2023/160617
PCT Pub. Date: Aug. 31, 2023

(65) Prior Publication Data

US 2024/0251056 A1 Jul. 25, 2024

(30) Foreign Application Priority Data

Feb. 25, 2022 (CN) ........................ 202210178989.X

(51) Int. Cl.
*H04N 7/01* (2006.01)

(52) U.S. Cl.
CPC ......... *H04N 7/0135* (2013.01); *H04N 7/0127* (2013.01)

(58) Field of Classification Search
USPC .......................................................... 386/353
See application file for complete search history.

(56) References Cited

U.S. PATENT DOCUMENTS 8,363,160 B2 * 1/2013 Yamauchi ...... H04N 21/440281 348/700
9,013,611 B1 * 4/2015 Szedo .................... H04N 23/88 348/242

(Continued)

FOREIGN PATENT DOCUMENTS

CN 101296344 A 10/2008
CN 101867759 A 10/2010

(Continued)

OTHER PUBLICATIONS

Guangquanxi Shuzi Shuiyin Jishu; Optical Holographic Digital Watermarking Technology; pp. 90-05 * Machine Translation **.

(Continued)

*Primary Examiner* — Nigar Chowdhury
(74) *Attorney, Agent, or Firm* — Frank Gao, Esq.

(57) ABSTRACT

A method and an apparatus for video frame interpolation processing, and a non-instantaneous readable storage medium. The method for video frame interpolation processing, including: acquiring the first video frame and the second video frame of the video; acquiring the first comparison result between the first video frame and the second video frame based on the first video frame and the second video frame; and determining whether to interpolate a frame between the first video frame and the second video frame based on the first comparison result. The first video frame and the second video frame are adjacent temporally, and the first video frame is a forward frame of the second video frame. The first comparison result indicates whether a picture switch exists between the first video frame and the second video frame.

13 Claims, 9 Drawing Sheets

(56) References Cited

U.S. PATENT DOCUMENTS

| | | | | |
|---|---|---|---|---|
| 10,230,920 | B1 * | 3/2019 | Yang | H04N 7/0127 |
| 10,657,784 | B1 * | 5/2020 | Gordon | G08B 13/1966 |
| 11,032,511 | B1 * | 6/2021 | Ge | H04N 7/0147 |
| 11,494,974 | B2 * | 11/2022 | Minato | G06T 15/20 |
| 2008/0266457 | A1 | 10/2008 | Sasakura | |
| 2010/0328529 | A1 * | 12/2010 | Hirayama | H04N 7/0132 348/E7.003 |
| 2011/0051003 | A1 * | 3/2011 | Zhou | H04N 19/14 348/576 |
| 2012/0092502 | A1 * | 4/2012 | Knasel | H04N 7/18 340/565 |
| 2012/0182377 | A1 * | 7/2012 | Wang | H04N 7/142 348/E7.083 |
| 2013/0100346 | A1 * | 4/2013 | Otsuka | G11B 27/031 348/E7.002 |
| 2013/0102904 | A1 * | 4/2013 | Katou | A61B 8/5207 600/447 |
| 2013/0169752 | A1 * | 7/2013 | Tsukagoshi | H04N 21/816 348/43 |
| 2013/0222542 | A1 * | 8/2013 | Tsukagoshi | H04N 13/128 348/43 |
| 2013/0300750 | A1 * | 11/2013 | Mishra | H04N 21/45455 345/474 |
| 2014/0002732 | A1 | 1/2014 | Gilmutdinov et al. | |
| 2014/0059317 | A1 * | 2/2014 | Okajima | G06F 12/02 711/165 |
| 2014/0327819 | A1 * | 11/2014 | Wu | H04N 5/145 348/441 |
| 2015/0071605 | A1 * | 3/2015 | Ogawa | H04N 5/775 386/241 |
| 2016/0191946 | A1 * | 6/2016 | Zhou | H04N 19/17 375/240.16 |
| 2017/0339431 | A1 * | 11/2017 | Zhang | H04N 19/513 |
| 2020/0051207 | A1 * | 2/2020 | Ogasawara | G06F 3/012 |
| 2021/0067735 | A1 * | 3/2021 | Reda | G06N 3/045 |
| 2021/0073551 | A1 | 3/2021 | Li et al. | |
| 2021/0076016 | A1 * | 3/2021 | Sviridenko | H04L 65/403 |
| 2021/0168329 | A1 * | 6/2021 | Song | H04N 7/0135 |
| 2021/0360252 | A1 * | 11/2021 | Li | H04N 19/132 |
| 2022/0027633 | A1 * | 1/2022 | Jo | G06N 3/088 |
| 2022/0109823 | A1 * | 4/2022 | Minato | H04N 13/282 |
| 2022/0217375 | A1 * | 7/2022 | Wang | H04N 19/30 |

FOREIGN PATENT DOCUMENTS

| | | | |
|---|---|---|---|
| CN | 203313319 | U | 11/2013 |
| CN | 106210767 | A | 12/2016 |
| CN | 109803175 | A | 5/2019 |
| CN | 110708568 | A | 1/2020 |
| CN | 110933496 | A | 3/2020 |
| CN | 111182347 | A | 5/2020 |
| CN | 111277895 | A | 6/2020 |
| CN | 111356026 | A | 6/2020 |
| CN | 111510758 | A | 8/2020 |
| CN | 111641828 | A | 9/2020 |
| CN | 111641829 | A | 9/2020 |
| CN | 111918099 | A | 11/2020 |
| CN | 112584196 | A | 3/2021 |
| CN | 112584232 | A | 3/2021 |
| CN | 112788337 | A | 5/2021 |
| CN | 112802469 | A | 5/2021 |
| CN | 112995715 | A | 6/2021 |
| CN | 113052169 | A | 6/2021 |
| CN | 108600773 | B | 8/2021 |
| CN | 113691758 | | 11/2021 |
| CN | 113766314 | A | 12/2021 |
| CN | 114554285 | A | 5/2022 |
| JP | 2003299000 | A | 10/2003 |

OTHER PUBLICATIONS

Jia Lyu, et al. "Image Super-resolution Reconstruction Algorithm Based on Multi-scale Adaptive Upsampling", Journal of Frontiers of Computer Science and Technology; 2023; 13 pages; doi: 10.3778/j.issn.1673-9418.2107136.

The First Chinese Office Action dated Nov. 1, 2023; Appln. No. 202210178989.X.

* cited by examiner

VIDEO FRAME INTERPOLATION PROCESSING METHOD, VIDEO FRAME INTERPOLATION PROCESSING DEVICE, AND READABLE STORAGE MEDIUM

This application is a National Stage of International Application No. PCT/CN2023/077905, filed Feb. 23, 2023, the entirety of which is hereby incorporated herein by reference.

TECHNICAL FIELD

Embodiments of the present disclosure relate to a method and an apparatus for video frame interpolation processing, and a non-instantaneous readable storage medium.

BACKGROUND

The video processing is a typical application of artificial intelligence, and the video frame interpolation technology is also a typical technology in the video processing. The video frame interpolation technology aims to synthesize intermediate video frames with smooth transitions based on the front and back video frames in a video, in order to make video playback smoother and improve the user's viewing experience. For example, a video with a frame rate of 24 can be transformed into a video with a frame rate of 48 through the video frame interpolation processing, allowing the users to feel the video clearer and smoother when watching.

SUMMARY

At least one embodiment of the present disclosure provides a method for video frame interpolation processing, including: acquiring the first video frame and the second video frame of the video; acquiring the first comparison result between the first video frame and the second video frame based on the first video frame and the second video frame; and determining whether to interpolate a frame between the first video frame and the second video frame based on the first comparison result. The first video frame and the second video frame are adjacent temporally, and the first video frame is a forward frame of the second video frame. The first comparison result indicates whether a picture switch exists between the first video frame and the second video frame.

For example, in the method provided in at least one embodiment of the present disclosure, the picture switch includes a subtitle switch and/or a scene switch.

For example, in the method provided in at least one embodiment of the present disclosure, acquiring the first comparison result between the first video frame and the second video frame based on the first video frame and the second video frame, includes: determining whether the subtitle switch exists between the first video frame and the second video frame based on whether a subtitle content of the first video frame and a subtitle content the second video frame are identical.

For example, in the method provided in at least one embodiment of the present disclosure, determining whether the subtitle switch exists between the first video frame and the second video frame based on whether the subtitle content of the first video frame and the subtitle content of the second video frame are identical, includes: acquiring an audio segment corresponding to the first video frame; acquiring a start video frame and an end video frame corresponding to the audio segment based on the audio segment; and determining whether the subtitle switch exists between the first video frame and the second video frame based on the start video frame and the end video frame.

For example, in the method provided in at least one embodiment of the present disclosure, determining whether the subtitle switch exists between the first video frame and the second video frame based on the start video frame and the end video frame, includes: in response to the second video frame being between the start video frame and the end video frame, determining that the subtitle switch does not exist between the first video frame and the second video frame; and in response to the second video frame not being between the start video frame and the end video frame, determining that the subtitle switch exists between the first video frame and the second video frame.

For example, in the method provided in at least one embodiment of the present disclosure, determining whether the subtitle switch exists between the first video frame and the second video frame based on whether the subtitle content of the first video frame and the subtitle content the second video frame are identical, includes: acquiring the first recognition text content of the first video frame; acquiring the second recognition text content of the second video frame; and in response to the first recognition text content and the second recognition text content being identical, determining that the subtitle switch does not exist between the first video frame and the second video frame.

For example, in the method provided in at least one embodiment of the present disclosure, determining whether the subtitle switch exists between the first video frame and the second video frame based on whether the subtitle content of the first video frame and the subtitle content the second video frame are the same, further includes: in response to the first recognition text content being different from the second recognition text content acquiring a first sub-image of the first video frame; acquiring a second sub-image of the second video frame; and determining whether the subtitle switch exists between the first video frame and the second video frame based on the first sub-image and the second sub-image. The first sub-image corresponds to the first subtitle content of the first video frame; and the second sub-image corresponds to the second subtitle content of the second video frame.

For example, in the method provided in at least one embodiment of the present disclosure, determining whether the subtitle switch exists between the first video frame and the second video frame based on the first sub-image and the second sub-image, includes: determining the first similarity between the first sub-image and the second sub-image based on the first sub-image and the second sub-image; in response to the first similarity being greater than the first threshold, determining that the subtitle switch does not exist between the first video frame and the second video frame; and in response to the first similarity being not greater than the first threshold, determining that the subtitle switch exists between the first video frame and the second video frame.

For example, in the method provided in at least one embodiment of the present disclosure, acquiring the first comparison result between the first video frame and the second video frame based on the first video frame and the second video frame, includes: determining whether the scene switch exists between the first video frame and the second video frame based on whether the scene of the first video frame and the scene of the second video frame are identical.

For example, in the method provided in at least one embodiment of the present disclosure, determining whether the scene switch exists between the first video frame and the second video frame based on whether the scene of the first video frame and the scene of the second video frame are identical, includes: acquiring the second similarity between the first video frame and the second video frame; in response to the second similarity being greater than the second threshold, determining that the scene switch does not exist between the first video frame and the second video frame; and in response to the second similarity being not greater than the second threshold, determining that the scene switch exists between the first video frame and the second video frame.

For example, in the method provided in at least one embodiment of the present disclosure, determining whether to interpolate a frame between the first video frame and the second video frame based on the first comparison result, includes: in response to the first comparison result indicating that the picture switch does not exist between the first video frame and the second video frame, determining to interpolate a frame between the first video frame and the second video frame; and in response to the first comparison result indicating that the picture switch exists between the first video frame and the second video frame, determining not to interpolate a frame between the first video frame and the second video frame.

For example, in the method provided in at least one embodiment of the present disclosure, further including: setting the first frame interpolation flag; and in response to the picture switch existing between the first video frame and the second video frame, modifying the first frame interpolation flag to the second frame interpolation flag.

For example, in the method provided in at least one embodiment of the present disclosure, further including: in response to the picture switch existing between the first video frame and the second video frame, acquiring the fourth video frame; acquiring the second comparison result between the second video frame and the fourth video frame based on the second video frame and the fourth video frame; determining whether to interpolate a frame between the second video frame and the fourth video based on the second comparison result. The fourth video frame and the second video frame are adjacent temporally, the second video frame is a forward frame of the fourth video frame, and the second comparison result indicates whether the picture switch exists between the second video frame and the fourth video frame.

For example, in the method provided in at least one embodiment of the present disclosure, determining whether to interpolate a frame between the second video frame and the fourth video based on the second comparison result, includes: in response to the second comparison result indicating that the picture switch does not exist between the second video frame and the fourth video frame, interpolating a plurality of video frames between the second video frame and the fourth video frame. The number of the plurality of video frames is based on the second frame interpolation flag.

For example, in the method provided in at least one embodiment of the present disclosure, determining whether to interpolate a frame between the second video frame and the fourth video based on the second comparison result, includes: in response to the second comparison result indicating that the picture switch exists between the second video frame and the fourth video frame, determining not to interpolate a frame between the second video frame and the fourth video frame; and modifying the second frame interpolation flag to the third frame interpolation flag. The third frame interpolation flag is used to indicate the number of frames to be interpolated next.

For example, in the method provided in at least one embodiment of the present disclosure, further including: in response to interpolating the third video frame between the first video frame and the second video frame, acquiring the first sub-image of the first video frame; acquiring the third sub-image of the third video frame; and determining whether to replace the third video frame with the first video frame based on the first sub-image and the third sub-image. The first sub-image corresponds to the first subtitle content of the first video frame, and the third sub-image corresponds to the third subtitle content of the third video frame.

For example, in the method provided in at least one embodiment of the present disclosure, determining whether to replace the third video frame with the first video frame based on the first sub-image and the third sub-image, includes: acquiring a pixel value of the first pixel in the first sub-image; setting a pixel value of the third pixel in the third sub image based on the pixel value of the first pixel in the first sub-image; and determining whether to replace the third video frame with the first video frame based on the first sub-image and the set third sub-image. The pixel value of the first pixel is greater than the third threshold; and the relative position of the third pixel in the third sub-image is the same as the relative position of the first pixel in the first sub-image.

At least one embodiment of the present disclosure also provides an apparatus for video frame interpolation processing including an acquisition module, a comparison module, and an operation module. The acquisition module is configured to acquire the first video frame and the second video frame of the video. The first video frame and the second video frame are adjacent temporally, and the first video frame is a forward frame of the second frame. The comparison module is configured to acquire the first comparison result between the first video frame and the second video frame based on the first video frame and the second video frame. The first comparison result indicates whether a picture switch exists between the first video frame and the second video frame. The operation module is configured to determine whether to interpolate a frame between the first video frame and the second video frame based on the first comparison result.

At least one embodiment of the present disclosure also provides an apparatus for video frame interpolation processing including a processor and a memory. The memory includes one or more computer program modules. The one or more computer program modules are stored in the memory and are configured to be executed by the processor, and the one or more computer program modules include instructions for executing the method for video frame interpolation processing in any of the above embodiments.

At least one embodiment of the present disclosure also provides a non-instantaneous readable storage medium storing computer instructions. The computer instructions upon execution by a processor, cause the processor to execute the method for video frame interpolation processing in any of the above embodiments.

BRIEF DESCRIPTION OF THE DRAWINGS

In order to illustrate the technical solutions of the embodiments of the present disclosure more clearly, the drawings of the embodiments are briefly introduced below. Apparently, the drawings described below only relate to some embodiments of the present disclosure, rather than limiting the present disclosure.

DETAILED DESCRIPTION

In order to make objects, technical details and advantages of the embodiments of the present disclosure apparent, the technical solutions of the embodiments are described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Flowcharts are used in the present disclosure to illustrate the operations performed by the system according to the embodiments of the present application. It should be understood that the preceding or following operations are not necessarily performed in an exact order. Instead, various steps may be processed in reverse order or concurrently, as desired. At the same time, other operations can be added to these procedures, or a certain step or steps can be removed from these procedures.

Unless otherwise defined, all the technical and scientific terms used herein have the same meanings as commonly understood by those of ordinary skill in the art to which the present disclosure belongs. The terms "first", "second", and the like, which are used in the description and the claims of the present disclosure, are not intended to indicate any sequence, amount or importance, but used to distinguish various components. Similarly, the terms "a", "an", "the", or the like are not intended to indicate a limitation of quantity, but indicate that there is at least one. The terms, such as "comprise/comprising", "include/including", or the like are intended to specify that the elements or the objects stated before these terms encompass the elements or the objects and equivalents thereof listed after these terms, but not preclude other elements or objects. The terms, such as "connect/connecting/connected", "couple/coupling/coupled", or the like, are not limited to a physical connection or mechanical connection, but may include an electrical connection/coupling, directly or indirectly. The terms, "on", "under", "left", "right", or the like are only used to indicate relative position relationship, and when the position of the object which is described is changed, the relative position relationship may be changed accordingly.

Figure 1:
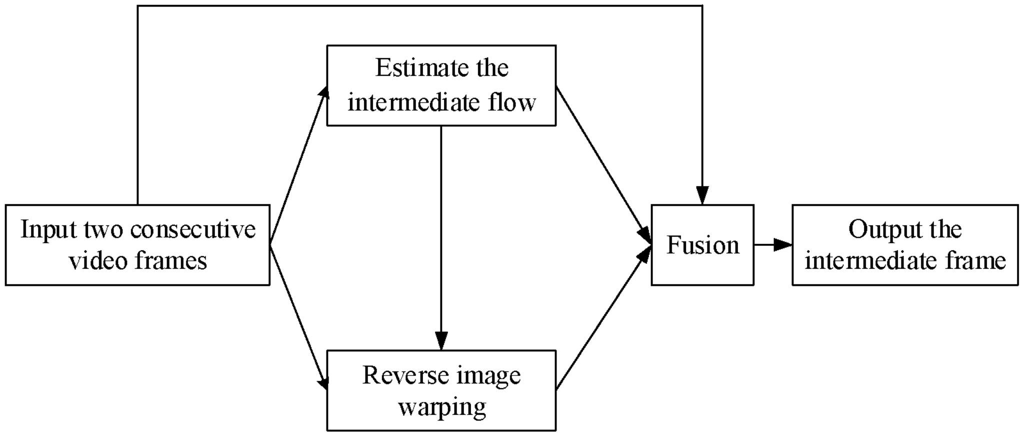
FIG. 1 is a schematic diagram of a method for video frame interpolation processing according to at least one embodiment of the present disclosure.

FIG. 1 is a schematic diagram of a method for video frame interpolation processing according to at least one embodiment of the present disclosure.

As illustrated in FIG. 1, the video frame interpolation technology is usually to synthesize an intermediate frame between two consecutive frames of a video, which is used to increase the frame rate and enhance the visual quality. In addition, the video frame interpolation technology can also support various applications such as slow-motion generation, video compression, training data generation for video motion deblurring, and the like. For example, video frame interpolation can use the optical flow prediction algorithm to predict an intermediate frame and interpolate the intermediate frame between two frames. The optical flow, like the flow of light, is a way to indicate the direction of target movement in an image by color. The optical flow prediction algorithm usually predicts an intermediate frame based on the previous and subsequent frames of the video. When the predicted frame is interpolated, the video looks smoother. For example, as illustrated in FIG. 1, the intermediate flow information is estimated by the network for two consecutive input frames, a rough result is obtained by reversely distorting the input frame, and the result is input into the fusion network together with the input frame and intermediate flow information to finally obtain the intermediate frame.

Currently, commonly used video frame interpolation algorithms cannot deal with the deformation problem well, for example, the deformation problem caused by scene switch, subtitle switch, and the like. This is because most video frame interpolation algorithms need to use the information of the previous and subsequent frames of the video. When the subtitles/scenes of the previous and subsequent frames of the video are switched, the optical flow information of the previous and subsequent frames cannot be correctly estimated, and therefore obvious deformation will occur.

At least to overcome the above technical problems, at least one embodiment of the present disclosure provides a method for video frame interpolation processing, including: acquiring the first video frame and the second video frame of the video; acquiring the first comparison result between the first video frame and the second video frame based on the first video frame and the second video frame; and determining whether to interpolate a frame between the first video frame and the second video frame based on the first comparison result. The first video frame and the second video frame are adjacent temporally, and the first video frame is a forward frame of the second video frame. The first comparison result indicates whether a picture switch exists between the first video frame and the second video frame.

Correspondingly, at least one embodiment of the present disclosure further provides an apparatus for video frame interpolation processing and a non-instantaneous readable storage medium corresponding to the above method for video frame interpolation processing.

The method of video frame interpolation processing according to at least one embodiment of the present disclosure can solve the obvious deformation problem caused by the video picture switch during the frame interpolation processing, ensure the smoothness of the video, and thereby improve the user's viewing experience.

The video frame interpolation processing method provided according to at least one embodiment of the present disclosure is non-limitingly described below through several examples or embodiments. As described below, different characters in these specific examples or embodiments may be combined with each other without conflicting with each other, thereby obtaining new examples or embodiments, and all of these new examples or embodiments also should be within the scope of the present disclosure.

Figure 2:
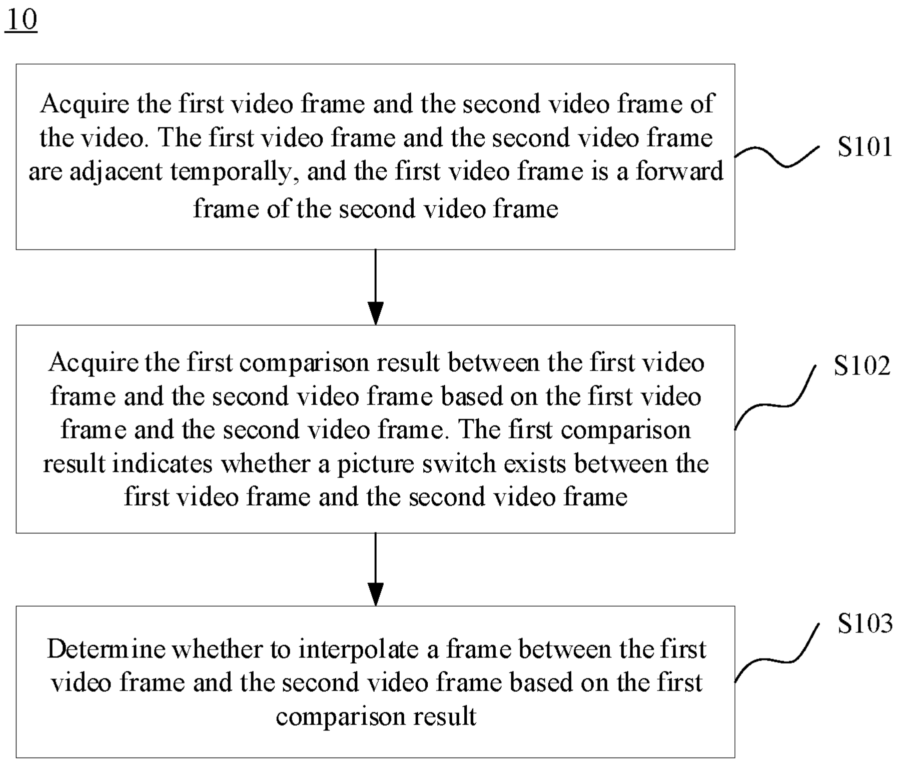
FIG. 2 is a schematic flowchart of a method for video frame interpolation processing according to at least one embodiment of the present disclosure.

FIG. 2 is a schematic flowchart of a method for video frame interpolation processing according to at least one embodiment of the present disclosure.

At least one embodiment of the present disclosure provides the method for video frame interpolation processing 10, as illustrated in FIG. 2. For example, the method for video frame interpolation processing 10 can be applied to any scene that requires video frame interpolation, for example, to various video products and services such as TV dramas, movies, documentaries, advertisements, music videos, and the like, and can also be applied to other aspects, the embodiments of the present disclosure do not limit this. As illustrated in FIG. 2, the method for video frame interpolation processing 10 includes the following steps S101 to S103.

S101: acquiring the first video frame and the second video frame of the video. The first video frame and the second video frame are adjacent temporally, and the first video frame is a forward frame of the second frame.

S102: acquiring the first comparison result between the first video frame and the second video frame based on the first video frame and the second video frame. The first comparison result indicates whether a picture switch exists between the first video frame and the second video frame.

S103: determining whether to interpolate a frame between the first video frame and the second video frame based on the first comparison result.

It should be noted that, in the embodiments of the present disclosure, the terms "first video frame" and "second video frame" are used to refer to any two temporally consecutive or adjacent images or video frames in the video or video frame sequence. The term "first video frame" is used to refer to the previous frame of the two temporally adjacent images, the term "second video frame" is used to refer to the subsequent frame of the two temporally adjacent frames of images, and the term "third video frame" is used to refer to an intermediate frame or an interpolation frame interpolated between two temporally adjacent images. The term "first video frame", "second video frame" or "third video frame" is not limited to a specific frame of image or a specific sequence. The term "first comparison result" is used to refer to the comparison result between two adjacent frames of images in the video, and is not limited to a specific comparison result or a specific order. It should also be noted that the embodiments of the present disclosure use the forward frames of two adjacent frames as a reference, or the backward frames of two adjacent frames as a reference, as long as the entire video frame interpolation processing method is consistent.

For example, in at least one embodiment of the present disclosure, for step S102, in order to avoid the deformation problem caused by the video picture switch between the previous and subsequent frames of the video, the first video frame and the second video frame which are adjacent can be compared to determine whether the picture switch exists between the first video frame and the second video frame.

For example, in at least one embodiment of the present disclosure, for step S103, it can be determined whether to perform a frame interpolation operation between the first video frame and the second video frame based on the first comparison result between the first video frame and the second video frame. For example, in some examples, the frame interpolation operation can be achieved by using the optical flow prediction method to calculate the intermediate frame/interpolation frame based on the adjacent first and second video frames.

It should be noted that the embodiments of the present disclosure do not specifically limit the method of how to acquire the intermediate frame/interpolation frame (i.e., the third video frame), and various conventional frame interpolation methods may be used to acquire the third video frame. For example, the intermediate frame/interpolation frame may be generated based on two adjacent video frames, may be generated based on more adjacent frames, or may be generated based on a specific or some specific video frames, which is not limited in the present disclosure and can be set according to the actual situation. For example, in at least one embodiment of the present disclosure, step S103 includes in response to the first comparison result indicating that the picture switch does not exist between the first video frame and the second video frame, determining to interpolate a frame between the first video frame and the second video frame; and in response to the first comparison result indicating that the picture switch exists between the first video frame and the second video frame, determining not to interpolate a frame between the first video frame and the second video frame.

Therefore, in the method for video frame interpolation processing 10 provided by at least one embodiment of the present disclosure, the frame interpolation operation is selectively performed according to the comparison result between adjacent video frames, which effectively avoids the obvious deformation problem caused by the video picture switch during the frame interpolation processing, ensures the smoothness of the video, and thereby improves the user's viewing experience.

For example, in at least one embodiment of the present disclosure, the picture switch between the first video frame and the second video frame include subtitle switch, scene switch, and the like. The embodiments of the present disclosure do not limit this.

For example, in one example, the subtitle in the first video frame is "Where are you going" and the subtitle in the second video frame is "I'm going to school". When the subtitle in the first video frame is different from the subtitle in the second video frame, it can be considered that a subtitle switch occurs between the first video frame and the second video frame. It should be noted that the embodiments of the present disclosure do not limit the subtitle content.

For example, in one example, when the scene in the first video frame is in a shopping mall, the scene in the second video frame is in a school, and the scene in the first video frame is different from the scene in the second video frame, it can be considered that a scene switch occurs between the first video frame and the second video frame. It should be noted that in the embodiments of the present disclosure, the scene in each video frame may include any scene such as the shopping mall, the school, the scenic spot, and the like. The embodiments of the present disclosure do not limit this.

For example, in at least one embodiment of the present disclosure, for step S102, acquiring the first comparison result between the first video frame and the second video frame based on the first video frame and the second video frame includes: determining whether the subtitle switch exists between the first video frame and the second video frame based on whether the subtitle content of the first video frame and the subtitle content of the second video frame are identical.

For example, in at least one embodiment of the present disclosure, for determining whether the subtitle switch occurs between adjacent frames, the start and end of each sentence in the audio of the video can be located to acquire the two video frames corresponding to the audio, and the two video frames can be marked according to the time information of the corresponding audio frames to determine whether the corresponding subtitle is switched.

Figure 3:
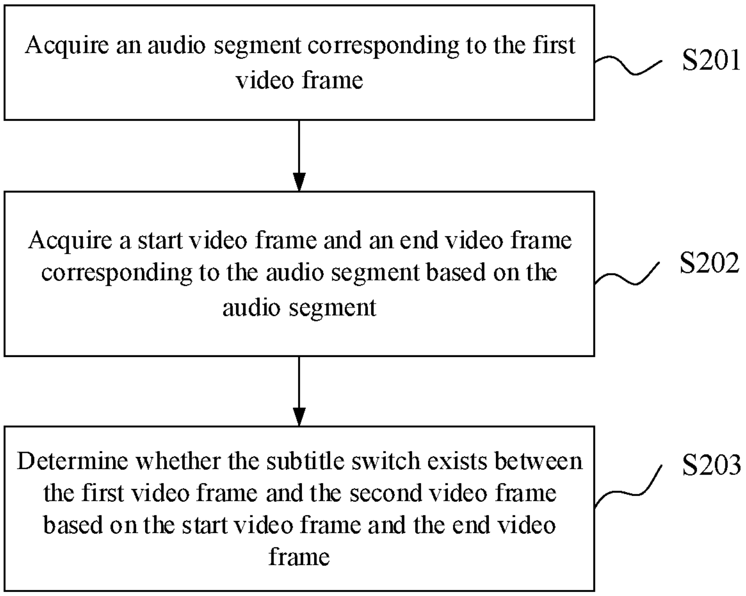
FIG. 3 is a flowchart of a method for determining whether a subtitle is switched according to at least one embodiment of the present disclosure.

FIG. 3 is a flowchart of a method for determining whether a subtitle is switched according to at least one embodiment of the present disclosure;

For example, in at least one embodiment of the present disclosure, determining whether the subtitle switch exists between the first video frame and the second video frame based on whether the subtitle content of the first video frame and the second video frame are the same, includes the following step S201 to S203, as illustrated in FIG. 3.

- S201: acquiring an audio segment corresponding to the first video frame.
- S202: acquiring a start video frame and an end video frame corresponding to the audio segment based on the audio segment.
- S203: determining whether the subtitle switch exists between the first video frame and the second video frame based on the start video frame and the end video frame.

It should be noted that in embodiments of the present disclosure, "start video frame" and "end video frame" are used to refer to two video frames determined based on the time information of the corresponding audio segment. The "start video frame" and "end video frame" are not limited to a particular video frame or a particular order.

For example, in at least one embodiment of the present disclosure, for step S201, the corresponding audio data can be input into a voice recognition system for voice segmentation, obtaining the voice recognition result and the corresponding time information. For example, the time information includes the start time and the end time of the corresponding audio segment. Based on the voice recognition result and the corresponding time information, an audio segment corresponding to the first video frame can be acquired.

For example, in at least one embodiment of the present disclosure, for step S202, based on the time information of the recognized corresponding audio segment, the start video frame and end video frame corresponding to the audio segment can be determined.

It should be noted that the embodiments of the present disclosure do not limit the voice recognition method, and any effective voice recognition method may be used.

For example, in at least one embodiment of the present disclosure, step S203 includes: in response to the second video frame being between the start video frame and the end video frame, determining that the subtitle switch does not exist between the first video frame and the second video frame; and in response to the second video frame not being between the start video frame and the end video frame, determining that the subtitle switch exists between the first video frame and the second video frame.

For example, in at least one example of the present disclosure, a video includes a sequence of video frames, for example, the video includes temporally adjacent video frame 1, video frame 2, video frame 3, video frame 4, video frame 5 . . . . Assuming that the first video frame is the video frame 2, and the audio segment corresponding to the first video frame is "where are you going", according to the time information of the audio segment (e.g., the start time point and end time point of a sentence), it is determined that the start video frame corresponding to the audio segment is video frame 1 and the end video frame is the video frame 4. In this case, it indicates that the subtitles displayed on the pictures for the video frame 1 to the video frame 4 are all "where are you going", that is, the same subtitle content is displayed. For example, assuming that the second video frame is the video frame 3, between the video frame 1 and the video frame 4, then no subtitle switch occurs between the first video frame and the second video frame. For another example, assuming that the second video frame is the video frame 5, not between the video frame 1 and the video frame 4, then a subtitle switch occurs between the first video frame and the second video frame. With the above operation, it can be determined which video frames have the subtitle switch through the audio corresponding to the video.

For example, in at least one embodiment of the present disclosure, for determining whether the subtitle switch occurs between adjacent video frames, in addition to determining by audio, a method of text recognition may also be used. For example, in some examples, a text recognition algorithm is used to acquire the subtitle contents displayed on the first video frame and the second video frame, and a comparison is made to determine whether the subtitle switch occurs between the first video frame and the second video frame. It should be noted that the embodiments of the present disclosure do not limit the text recognition algorithm, as long as the text content can be recognized.

Figure 4:
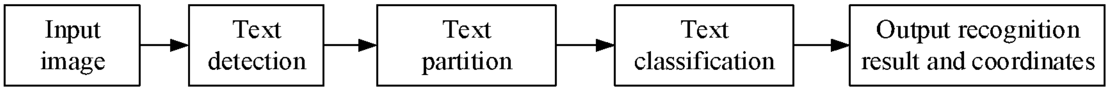
FIG. 4 is a schematic flowchart of a method for text recognition according to at least one embodiment of the present disclosure.

FIG. 4 is a schematic flowchart of a method for text recognition according to at least one embodiment of the present disclosure.

For example, in at least one embodiment of the present disclosure, as illustrated in FIG. 4. Through the text recognition algorithm, in addition to acquiring the recognized text content, the coordinates of the text can also be acquired. For example, in some examples, the acquired text coordinates may be the coordinates of the top left, bottom left, top right, and bottom right positions (i.e., four vertex positions) of a complete subtitle. For example, in some examples, text detection may be performed on the input image (or a single frame video) to determine the region where the text is located, and each character is partitioned separately. Then, a single text classifier (e.g., using the algorithm based on text feature vector correlation, the neural network-based algorithm, etc.) can be used to complete the classification of single text (which is assumed to be the character with a confidence degree greater than a certain threshold). Finally, the recognition result of the text and its coordinates are output. It should be noted that the embodiments of the present disclosure do not limit the specific operation of the text recognition method, and any effective text recognition method can be used.

For example, in at least one embodiment of the present disclosure, the determining whether the subtitle switch occurs between adjacent video frames (the first video frame and the second video frame) includes: acquiring the first recognition text content of the first video frame, acquiring the second recognition text content of the second video frame, in response to the first recognition text content and the second recognition text content being the same, determining that the subtitle switch does not exist between the first video frame and the second video frame.

It should be noted that in the embodiments of the present disclosure, the term "first recognition text content" or "second recognition text content" is used to refer to the recognition text content obtained by performing the text recognition operation on the corresponding video frame. The "first recognition text content" and "second recognition text content" are not limited to specific text contents or specific order.

For example, in at least one embodiment of the present disclosure, in order to recognize the subtitle more accurately, the scope for applying the text recognition operation can be set in advance. Because of the fixed display position of the subtitle in the video picture, it is possible to set the approximate region where the subtitle is located in advance.

Figure 5:
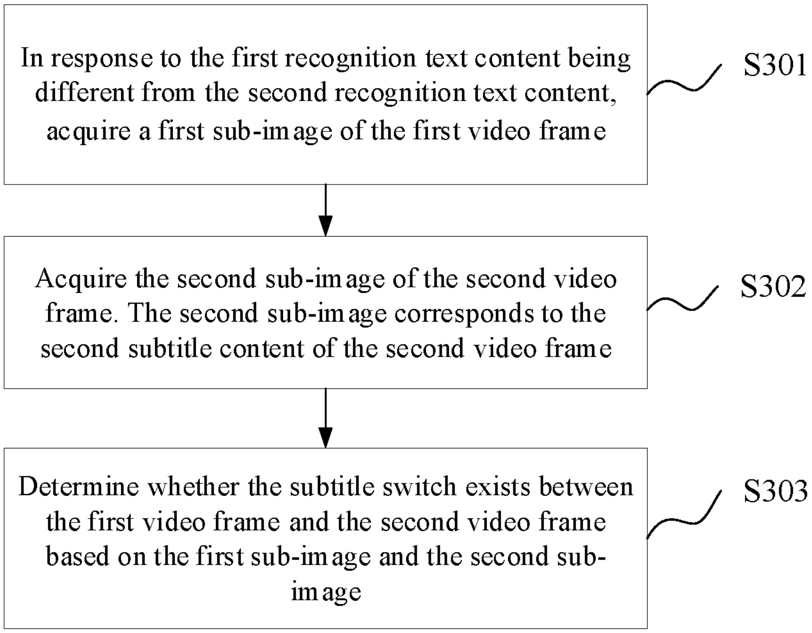
FIG. 5 is a schematic flowchart of another method for determining whether a subtitle is switched according to at least one embodiment of the present disclosure.

FIG. 5 is a schematic flowchart of another method for determining whether a subtitle is switched according to at least one embodiment of the present disclosure.

Usually, the text recognition algorithm cannot achieve 100% accuracy. For example, the text recognition algorithm may result in incomplete accuracy of text partitioning and other issues. For example, in some examples, text recognized in positions other than the subtitle causes the mismatch of the text sequence recognized in the previous and subsequent frames. In order to more accurately determine whether the subtitle switch exists, the method for video frame interpolation processing 10 provided in the embodiments of the present disclosure includes the following steps S301-S303, as illustrated in FIG. 5.

- S301: in response to the first recognition text content being different from the second recognition text content, acquiring the first sub-image of the first video frame. The first sub-image corresponds to the first subtitle content of the first video frame;
- S302: acquiring the second sub-image of the second video frame. The second sub-image corresponds to the second subtitle content of the second video frame;
- S303: determining whether the subtitle switch exists between the first video frame and the second video frame based on the first sub-image and the second sub-image.

It should be noted that in the embodiments of the present disclosure, the term "first subtitle content" or "second subtitle content" is used to refer to the subtitle content displayed in the corresponding video frame. The terms "first subtitle content" and "second subtitle content" are not limited to specific subtitle contents or the specific order.

It should also be noted that in the embodiments of the present disclosure, the term "first sub-image", "second sub-image", or "third sub-image" is used to refer to the image of the subtitle region in the corresponding video frame. The terms "first sub-image", "second sub-image", and "third sub-image" are not limited to specific images or a specific order.

For example, in at least one embodiment of the present disclosure, a text recognition operation is performed on a certain video frame, and the coordinates of the subtitle in the video frame are recognized (for example, the coordinates of the top left, bottom left, top right, and bottom right vertex positions of a complete sentence of a subtitle). Based on the coordinates, a region where the subtitle is located in the video frame can be obtained, thereby obtaining a sub-image corresponding to the subtitle content of the video frame.

For example, in at least one embodiment of the present disclosure, step S303 includes: determining the first similarity between the first sub-image and the second sub-image based on the first sub-image and the second sub-image; in response to the first similarity being greater than the first threshold, determining that the subtitle switch does not exist between the first video frame and the second video frame; and in response to the first similarity being not greater than the first threshold, determining that the subtitle switch exists between the first video frame and the second video frame.

It should be noted that in the embodiments of the present disclosure, the term "first similarity" is used to refer to the image similarity between subtitle sub-images of two adjacent video frames. The term "second similarity" is used to refer to the image similarity between two adjacent video frames. The terms "first similarity" and "second similarity" are not limited to a specific similarity or order.

It should also be noted that in the embodiments of the present disclosure, there are no limitations to the values of the terms "first threshold", "second threshold", and "third threshold", which can be set according to actual needs. The terms "first threshold", "second threshold", and "third threshold" are not limited to a specific value or order.

For example, in the embodiments of the present disclosure, the image similarity between two images can be calculated through various methods. For example, through the cosine similarity algorithm, the histogram algorithm, the perceptual hash algorithm, the mutual information-based algorithm, and the like. The embodiments of the present disclosure do not limit the methods for calculating image similarity, which can be selected according to actual needs.

For example, in at least one embodiment of the present disclosure, the structural similarity (SSIM) algorithm can be used to calculate the similarity between two images. For SSIM, it is a fully referenced image quality evaluation indicator that measures image similarity from three aspects: brightness, contrast, and structure. The formula for calculating SSIM is as follows:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

where $\mu_x$ represents the average value of x, $\mu_y$ represents the average value of y, $$\sigma_x^2$$

represents the variance of x, $$\sigma_y^z$$

represents the variance of y, $\sigma_{xy}$ represents the covariance of x and y. $c_1=(k_2L)^2$, $c_2=(k_2L)^2$ represent the constants for maintaining stability. L represents the dynamic range of the pixel value. $k_1=0.01$, $k_2=0.03$. The range of values for structural similarity is −1 to 1. The larger the value, the smaller the image distortion. When the two images are identical, the SSIM value is equal to 1.

For example, in at least one embodiment of the present disclosure, the "first threshold" can be set to 0.6 or 0.8. It should be noted that the embodiments of the present disclosure do not limit the value of the "first threshold", which can be set according to actual needs.

Figure 6:
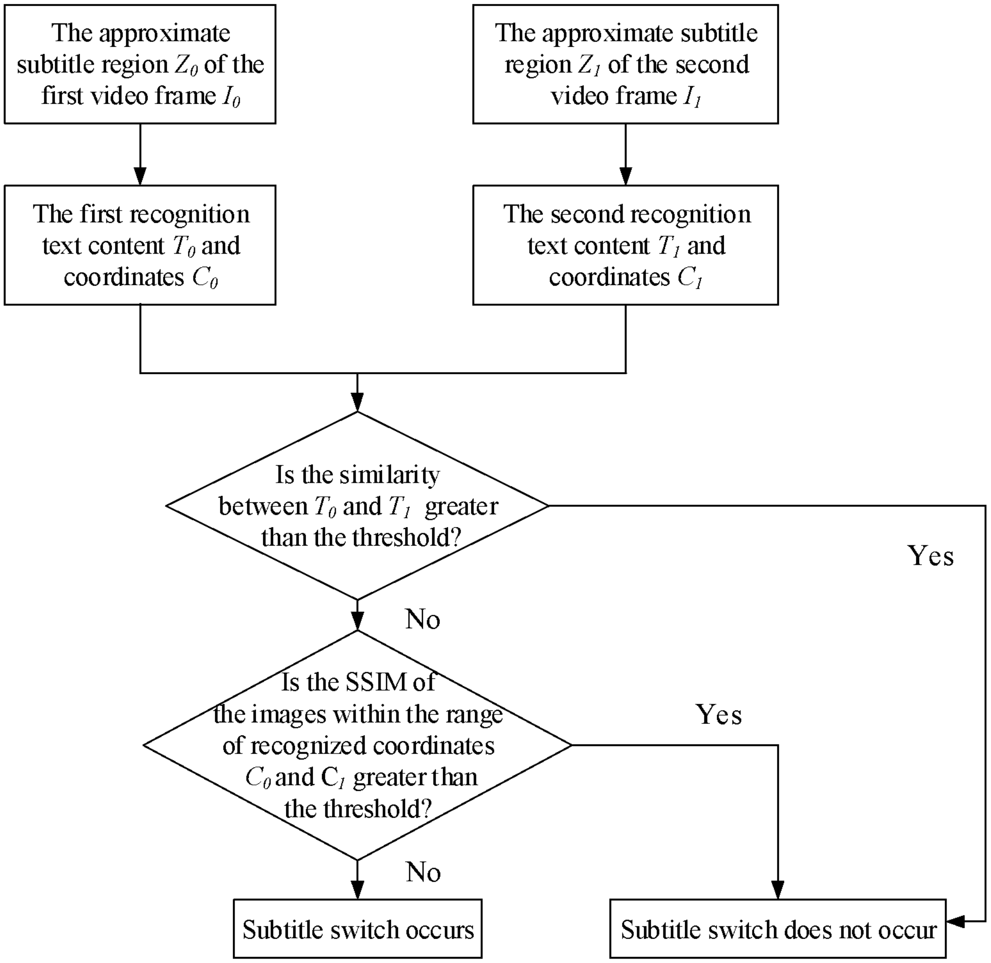
FIG. 6 is a schematic block diagram of still another method for determining whether a subtitle is switched according to at least one embodiment of the present disclosure.

FIG. 6 is a schematic block diagram of still another method for determining whether a subtitle is switched according to at least one embodiment of the present disclosure.

For example, in at least one embodiment of the present disclosure, as illustrated in FIG. 6, the text recognition operation is performed on the approximate subtitle region $Z_0$ of the first video frame $I_0$ and the approximate subtitle region $Z_1$ of the second video frame $I_1$, respectively, to obtain the first recognition text content $T_0$ and the second recognition text content $T_1$, as well as corresponding coordinates $C_0$ and $C_1$. Then, the text similarity between the first text recognition content $T_0$ and the second recognition text content $T_1$ is calculate to determine whether the first text recognition content $T_0$ and the second recognition text content $T_1$ are the same. When the similarity is greater than a certain threshold, it is considered that the first text recognition content $T_0$ and the second recognition text content $T_1$ are the same, that is, the subtitle switch does not occur. When the similarity is not greater than a certain threshold, the similarity between the first sub-image of the corresponding subtitle region $Z_0$ in the first video frame $I_0$ and the second sub-image of the corresponding subtitle region $Z_1$ in the second video frame $I_1$ is further determined. For example, as illustrated in FIG. 6, it is determined whether the SSIM of the images within the range of recognized coordinates $C_0$ and $C_1$ (i.e., the first sub-image and the second sub-image mentioned above) is greater than the threshold. If SSIM is greater than the threshold (for example, 0.8), it indicates that subtitle switch does not occur. If SSIM is not greater than the threshold (e.g., 0.8), it indicates that the subtitle switch occurs.

It should be noted that the embodiments of the present disclosure do not limit the method of calculating text similarity. For example, methods such as the Euclidean distance, the Manhattan distance, and the cosine similarity can be used to calculate text similarity. It should also be noted that the embodiments of the present disclosure do not specifically limit the threshold of the text similarity, which can be set according to actual needs.

For example, in at least one embodiment of the present disclosure, the picture switch includes the scene switch in addition to the subtitle switch. For example, step S102 includes: determining whether the scene switch exists between the first video frame and the second video frame based on whether the scene of the first video frame and the scene of the second video frame are identical.

For example, in at least one embodiment of the present disclosure, when the scene switch exists in the video, the image similarity (e.g., SSIM value) between the previous and subsequent frames of the image is significantly reduced. Therefore, the scene switch can be achieved by calculating the image similarity.

For example, in at least one embodiment of the present disclosure, the determining whether the scene switch exists between the first video frame and the second video frame includes the following steps: acquiring the second similarity between the first video frame and the second video frame; in response to the second similarity being greater than the second threshold, determining that the scene switch does not exist between the first video frame and the second video frame; in response to the second similarity being not greater than the second threshold, determining that the scene switch exists between the first video frame and the second video frame.

For example, in at least one embodiment of the present disclosure, the second similarity can be the structural similarity (SSIM), and can also be, for example, the perceptual hash algorithm, the histogram algorithm, and the like to calculate the similarity between images (i.e., video frames). The embodiments of the present disclosure do not limit the algorithm for calculating the image similarity.

It should be noted that, in the embodiments of the present disclosure, the number of frames to be interpolated is in the example of 2-fold interpolation. For example, interpolating from 30 fps (frames per second) to 60 fps indicates that the number of frames transmitted per second is increased from 30 frames to 60 frames. When a scene switch or a subtitle switch is detected between two adjacent video frames, no more frame interpolation is performed between the current two frames. In order to ensure that the number of frames is consistent, two frames are interpolated in the next frame interpolation. For another example, when the scene switch and the subtitle switch occur twice consecutively, it 1 results in two unexecuted frame interpolation operations. If only two frames are interpolated in the next frame interpolation, it would result in fewer frames in the overall video.

Figure 7:
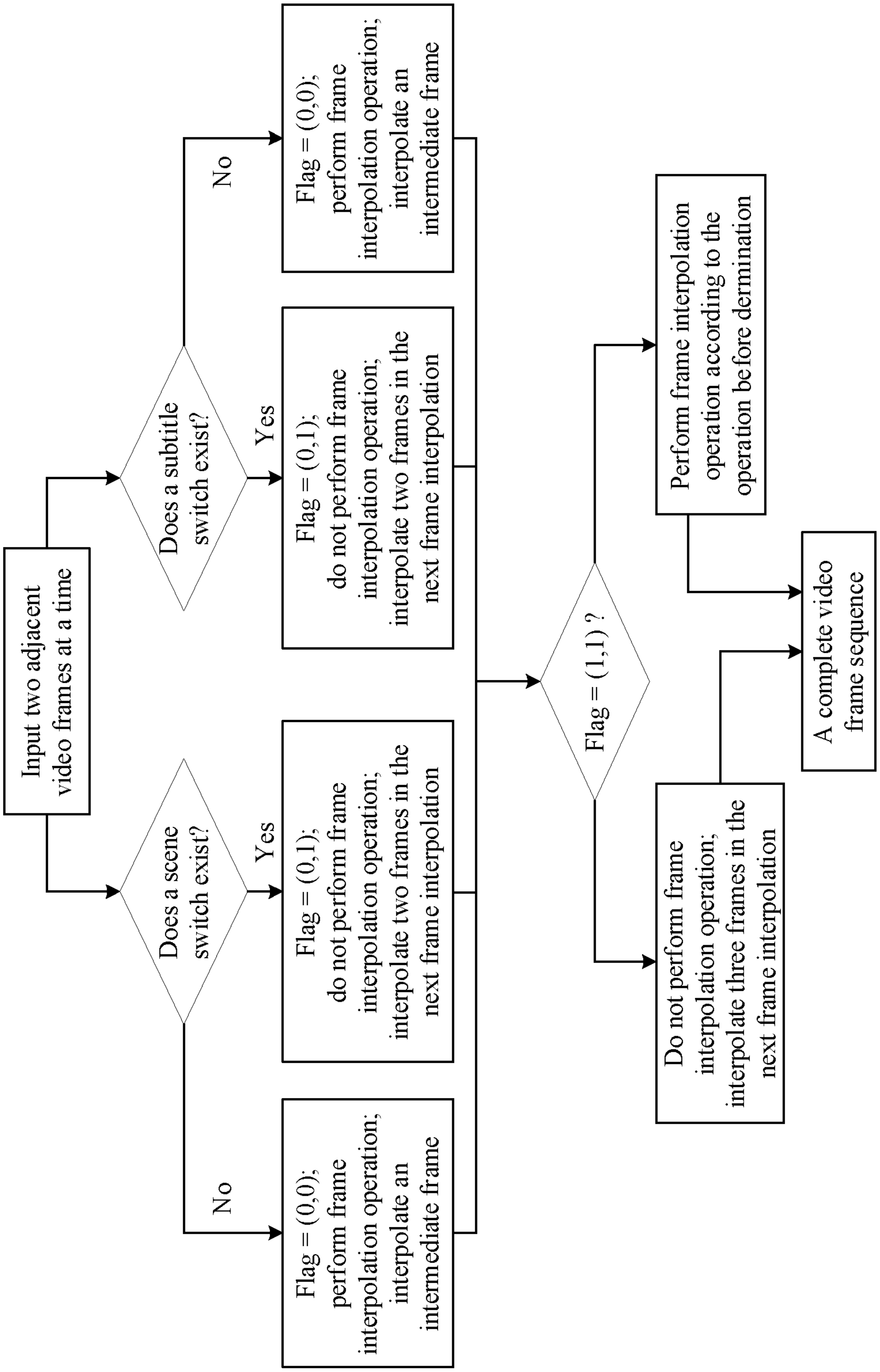
FIG. 7 is a schematic diagram of another method for video frame interpolation processing according to at least one embodiment of the present disclosure.

FIG. 7 is a schematic diagram of another method for video frame interpolation processing according to at least one embodiment of the present disclosure.

For example, in order to avoid the occurrence of fewer frames described above, in at least one embodiment of the present disclosure, in addition to steps S101-S103, the method for video frame interpolation processing 10 includes: setting the first frame interpolation flag; and in response to the picture switch existing between the first video frame and the second video frame, modifying the first frame interpolation flag to the second frame interpolation flag.

It should be noted that, in the embodiments of the present disclosure, the terms "first frame interpolation flag", "second frame interpolation flag" and "third frame interpolation flag" refer to frame interpolation flags at different time points or stages, so as to indicate how many consecutive picture switches exist in the video. The terms "first frame interpolation flag", "second frame interpolation flag" and "third frame interpolation flag" are not limited to a specific value or a specific order.

For example, in some examples, it is assumed that the video includes a sequence of video frames, for example, the video includes temporally adjacent video frame 1, video frame 2, video frame 3, video frame 4, video frame 5, . . . . For example, in one example, a frame interpolation flag is provided, for example, the frame interpolation flag is initialized as (0, 0). Two adjacent video frames (e.g., the first video frame and the second video frame) are input, assuming that the first video frame is the video frame 2 and the second video frame is the video frame 3. Whether there is a picture switch (subtitle switch or scene switch) between the video frame 2 and the video frame 3 is determined by the method described in the above embodiments. If a picture switch exists between the video frame 2 and the video frame 3, modify the frame interpolation flag from (0,0) to (0,1). For example, in some examples, when it is determined that a picture switch occurs between two adjacent video frames, a value "1" is added to the frame interpolation flag (0,0), and the previous value "0" is popped up, that is, the updated interpolation flag is (0,1). When it is determined that there is no picture switching between two adjacent video frames, a value "0" is added to the frame interpolation flag (0,0), and the previous value "0" is popped up, that is, the updated frame interpolation flag is (0,0).

For example, in at least one embodiment of the present disclosure, in response to the picture switch existing between the first video frame and the second video frame, acquiring the fourth video frame. Acquiring the second comparison result between the second video frame and the fourth video frame based on the second video frame and the fourth video frame. Determining whether to interpolate a frame between the second video frame and the fourth video based on the second comparison result. The fourth video frame and the second video frame are adjacent temporally, and the second video frame is a forward frame of the fourth video frame. The second comparison result indicates whether the picture switch exists between the second video frame and the fourth video frame.

For example, in at least one embodiment of the present disclosure, determining whether to interpolate a frame between the second video frame and the fourth video based on the second comparison result, includes: in response to the second comparison result indicating that the picture switch does not exist between the second video frame and the fourth video frame, interpolating a plurality of video frames between the second video frame and the fourth video frame. The number of the plurality of video frames is based on the second frame interpolation flag.

For example, in at least one embodiment of the present disclosure, the determining whether to interpolate a frame between the second video frame and the fourth video based on the second comparison result, includes: in response to the second comparison result indicating that the picture switch exists between the second video frame and the fourth video frame, determining not to interpolate a frame between the second video frame and the fourth video frame; and modifying the second frame interpolation flag to the third frame interpolation flag. The third frame interpolation flag is used to indicate the number of frames to be interpolated next.

It should be noted that the term "fourth video frame" is used to refer to the subsequence frame temporally adjacent to the "second video frame", and the fourth video frame is not limited to a specific frame or a specific order. The term "second comparison result" is used to refer to the comparison result between two adjacent frames (the second video frame and the fourth video frame) in the video, and is not limited to a specific comparison result or a specific order.

For example, in some examples, it is assumed that the video includes a sequence of video frames, for example, the video includes temporally adjacent video frame 1, video frame 2, video frame 3, video frame 4, video frame 5, . . . . Assuming that the first video frame is the video frame 1, the second video frame is the video frame 2, and the fourth video frame is the video frame 3. As illustrated in FIG. 7, if the video frame 1 and the video frame 2 are input, it is determined that a picture switch (subtitle switch or scene switch) exists between the video frame 1 and the video frame 2, in this case, no frame interpolation operation is performed between the video frame 1 and the video frame 2, and the frame interpolation flag is set to (0,1). Then, two adjacent video frames, that is, the video frame 2 and the video frame 3, are input and it is determined whether a picture switch (subtitle switch or scene switch) exists between the video frame 2 and the video frame 3 through the method provided by the above embodiments. For example, if it is determined that no picture switch exists between the video frame 2 and the video frame 3, a frame interpolation operation is performed between the video frame 2 and the video frame 3. In this case, the frame interpolation flag is (0, 1), indicating that a picture switch occurs (i.e., there is no frame interpolation between the video frame 1 and the video frame 2). In order to avoid the problem of fewer frames, it is necessary to interpolate two video frames between the video frame 2 and the video frame 3. For another example, if it is determined that the picture switch still exists between the video frame 2 and the video frame 3, the frame interpolation operation between the video frame 2 and the video frame 3 is not performed. In this case, the frame interpolation flag is modified from (0,1) to (1,1). For example, a value "1" is added to the frame interpolation flag (0,1), and the previous value "0" is popped out. The frame interpolation flag (1,1) indicates that there are two consecutive picture switches in the video frame sequence. For example, a picture switch exists between the video frame 1 and the video frame 2, and a picture switch still exists between the video frame 2 and the video frame 3. For example, continue to compare the video frame 3 and the video frame 4 through the similar operation. If no picture switch exists between the video frame 3 and the video frame 4, the frame interpolation operation can be performed. In order to avoid the problem of fewer frames, based on the frame interpolation flag (1,1), it can be seen that 3 video frames need to be interpolated between the video frame 3 and the video frame 4. Thus, the overall integrity of the video after frame interpolation is guaranteed.

It should be noted that in the practical application, it is rare for the picture switch to occur in several consecutive adjacent video frames. Therefore, the above embodiments of the present disclosure take up to 2 consecutive picture switches as an example, and initialize the frame interpolation flag to (0,0). The embodiments of the present disclosure do not limit this, and it may be set according to actual needs.

Figure 8:
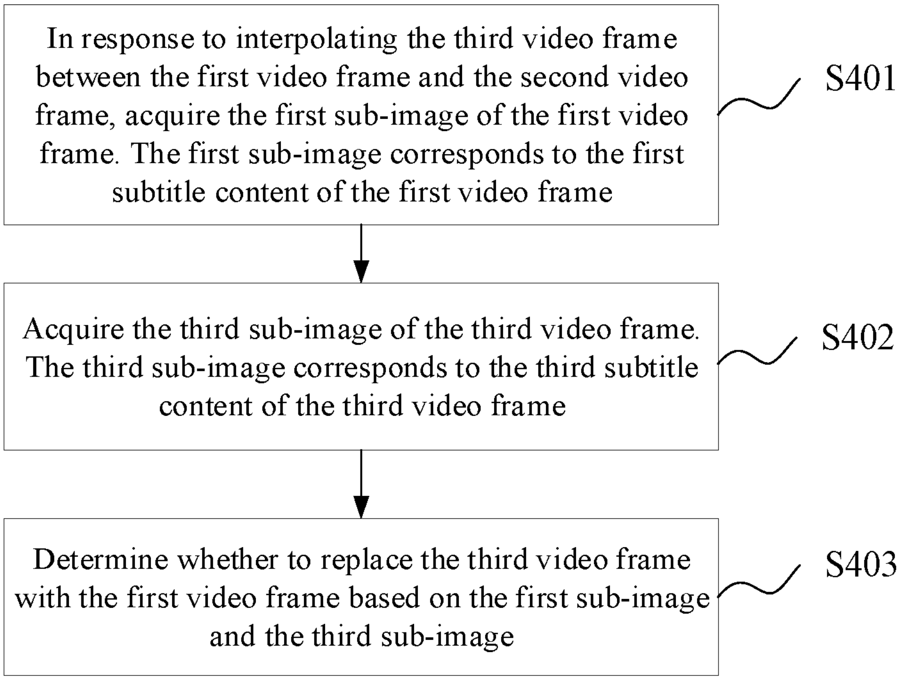
FIG. 8 is a schematic flowchart of a method for post-processing according to at least one embodiment of the present disclosure.

FIG. 8 is a schematic flowchart of a method for frame interpolation post-processing according to at least one embodiment of the present disclosure.

For example, in at least one embodiment of the present disclosure, the method for video frame interpolation processing 10 further includes the following steps S401-S403, as illustrated in FIG. 8.

- S401: in response to interpolating the third video frame between the first video frame and the second video frame, acquiring the first sub-image of the first video frame. The first sub-image corresponds to the first subtitle content of the first video frame.
- S402: acquiring the third sub-image of the third video frame. The third sub-image corresponds to the third subtitle content of the third video frame.
- S403: determining whether to replace the third video frame with the first video frame based on the first sub-image and the third sub-image.

For example, in at least one embodiment of the present disclosure, step S403 includes: acquiring a pixel value of the first pixel in the first sub-image; setting a pixel value of the third pixel in the third sub image based on the pixel value of the first pixel in the first sub-image; and determining whether to replace the third video frame with the first video frame based on the first sub-image and the third sub-image after being set. The pixel value of the first pixel is greater than the third threshold. The relative position of the third pixel in the third sub-image is identical to the relative position of the first pixel in the first sub-image.

For example, in the embodiments of the present disclosure, the relative position of the third pixel in the third sub-image and the relative position of the first pixel in the first sub-image are the same. It can be understood that, for example, taking the top left corner vertex of the first sub-image as the coordinate origin, the position coordinates of the first pixel in this coordinate system are the same as the position coordinates of the third pixel in the coordinate system taking the top left corner vertex of the third sub-image as the coordinate origin.

Figure 9:
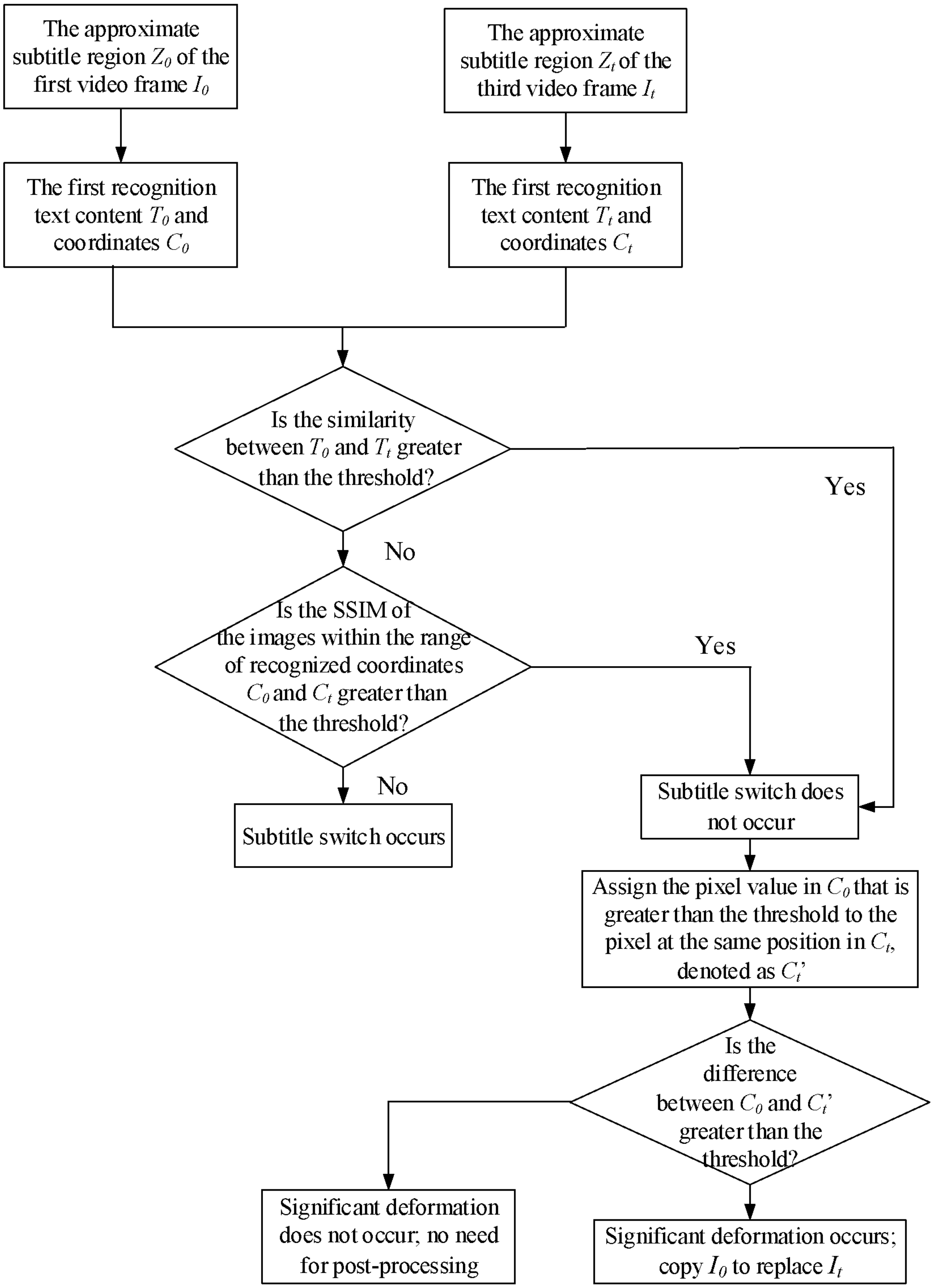
FIG. 9 is a schematic diagram of another method for video frame interpolation processing according to at least one embodiment of the present disclosure.

Based on the detailed description associated with FIG. 9, the method for video frame interpolation processing 10, including the operations illustrated in FIG. 8, can solve the deformation problem caused by significant movement of the subtitle background in video frame interpolation processing. FIG. 9 is a schematic diagram of another method for video frame interpolation processing according to at least one embodiment of the present disclosure.

For example, in some examples, when interpolating a third video frame between the first video frame and the second video frame, in order to improve the accuracy of frame interpolation, it can be determined whether the subtitle of the first video frame and the subtitle of the third video frame are the same, that is, whether the subtitle switch occurs, as illustrated in FIG. 9. For example, it can be determined by the method provided in the above embodiment to determine whether the subtitle switch occurs between adjacent video frames. For example, the part of the operation can refer to the relevant description corresponding to FIG. 6, and will not be repeated here. For example, after determining by the method illustrated in FIG. 6 that there is no subtitle switch between the first video frame and the third video frame, further processing can be performed.

For example, in some examples, because the color of the subtitle usually remains stable, for example, most subtitles are white, it is possible to select the pixel (i.e., the first pixel) in the first sub-image of the first video frame (i.e., the region corresponding to the recognized coordinate $C_0$) which is greater than a certain threshold (i.e., the third threshold). For example, the third threshold is set to 220, and the pixel value range is generally 0-255. The value of the first pixel is assigned to the pixel located at the same position as the first pixel (i.e., the third pixel) in the third sub-image (i.e., the region corresponding to the recognized coordinate $C_t$. For example, in FIG. 9, the assigned third sub-image is marked as $C_t'$. Because the significant movement of the subtitle background, the deformation of the subtitle is usually significantly beyond the range of the original character. Therefore, by comparing the first sub-image with the assigned third sub-image, it can be determined whether there is significant deformation in the subtitle of the interpolation frame.

For example, in at least one embodiment of the present disclosure, comparing the first sub-image and the assigned third sub-image includes subtracting each pixel value of each corresponding pixel of the first sub-image and the assigned third sub-image, and determining whether the number of pixels for which the absolute value of the pixel difference exceeds a certain threshold (e.g., 150) is greater than another threshold (e.g., 30). If the number of pixels for which the absolute value of the pixel difference exceeds 150 is greater than 30, it is considered that there is a significant deformation in the subtitle of the interpolated third video frame. The first video frame is directly copied to replace the deformed interpolation frame (i.e., the third video frame). Of course, the second video frame can also be used to replace the deformed interpolation frame (i.e., the third video frame), and the embodiments of the present disclosure do not limit this. Such that, the deformation problem caused by the significant movement of the subtitle background can be avoided.

Figure 10:
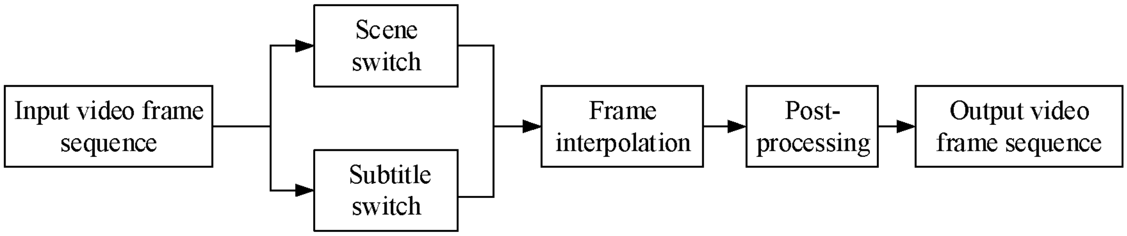
FIG. 10 is a schematic block diagram of still another method for video frame interpolation processing according to at least one embodiment of the present disclosure.

FIG. 10 is a schematic block diagram of still another method for video frame interpolation processing according to at least one embodiment of the present disclosure.

As illustrated in FIG. 10, at least one embodiment of the present disclosure provides a method for video frame interpolation processing that can not only solve the deformation problem caused by scene switch and subtitle switch, but also solve the obvious deformation problem caused by the significant movement of the subtitle background through a post-processing after frame interpolation. The operations in each box of the method described in FIG. 10 are described in detail above and will not be repeated here.

Therefore, the video frame interpolation processing method 10 provided by at least one embodiment of the present disclosure can solve the obvious deformation problem caused by the video picture switch and the significant movement of the subtitle background during the frame interpolation processing, ensures the smoothness of the video, and thereby improves the user's viewing experience.

It should also be noted that in the various embodiments of the present disclosure, the execution order of each step of the video frame interpolation processing method 10 is not limited. Although the execution process of each step is described in a specific order above, this does not constitute a limitation on the embodiments of the present disclosure. The various steps in the video frame interpolation processing method 10 can be executed serially or in parallel, according to actual needs. For example, the video frame interpolation processing method 10 may also include more or fewer steps, and the embodiments of the present disclosure do not limit this.

At least one embodiment of the present disclosure also provides an apparatus for video frame interpolation processing, the frame interpolation operation is selectively performed according to the comparison result between adjacent video frames. This effectively avoids the obvious deformation problem caused by the video picture switch during the frame interpolation processing, ensures the smoothness of the video, and thereby improves the user's viewing experience.

Figure 11:
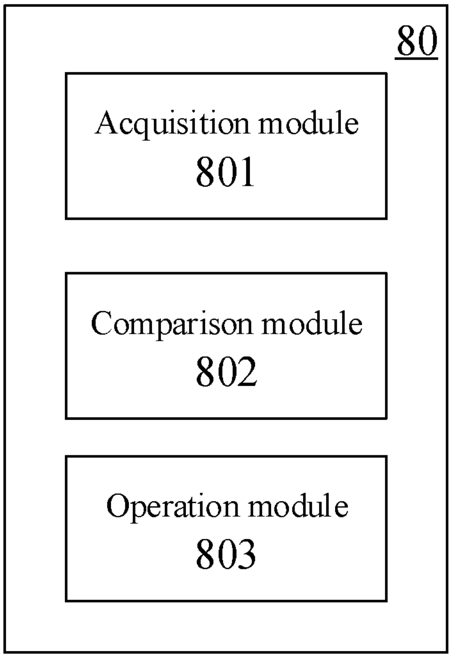
FIG. 11 is a schematic block diagram of an apparatus for video frame interpolation processing according to at least one embodiment of the present disclosure.

FIG. 11 is a schematic block diagram of an apparatus for video frame interpolation processing according to at least one embodiment of the present disclosure.

For example, in at least one embodiment of the present disclosure, as illustrated in FIG. 11, the apparatus for video frame interpolation processing 80 includes an acquisition module 801, a comparison module 802, and an operation module 803.

For example, in at least one embodiment of the present disclosure, the acquisition module 801 is configured to acquire the first video frame and the second video frame of the video. The first video frame and the second video frame are adjacent temporally, and the first video frame is a forward frame of the second video frame. For example, the acquisition module 801 can implement the step S101, and the specific implementation method can refer to the relevant description of the step S101, which will not be repeated here.

For example, in at least one embodiment of the present disclosure, the comparison module 802 is configured to acquire the first comparison result between the first video frame and the second video frame based on the first video frame and the second video frame. The first comparison result indicates whether a picture switch exists between the first video frame and the second video frame. For example, the comparison module 802 can implement the step S102, and the specific implementation method can refer to the relevant description of the step S102, which will not be repeated here.

For example, in at least one embodiment of the present disclosure, the operation module 803 is configured to determine whether to interpolate a frame between the first video frame and the second video frame based on the first comparison result. For example, the operation module 803 can implement the step S103, and the specific implementation method can refer to the relevant description of the step S103, which will not be repeated here.

It should be noted that the acquisition module 801, the comparison module 802, and the operation module 803 can be implemented through software, hardware, firmware, or any combination of them. For example, they can be respectively implemented as an acquisition circuit 801, a comparison circuit 802, and an operation circuit 803. The embodiments of the present disclosure do not limit the specific implementations of them.

It should be understood that the apparatus for video frame interpolation processing 80 provided in the embodiments of the present disclosure may implement the aforementioned method for video frame interpolation processing 10, and may also achieve technical effects similar to the aforementioned method for video frame interpolation processing 10, which will not be repeated here.

It should be noted that in the embodiments of the present disclosure, the video frame interpolation processing apparatus 80 may include more or fewer circuits or units, and the connection relationship between each circuit or unit is not limited and can be determined according to actual needs. The specific composition of each circuit is not limited, and can be composed of analog devices based on circuit principles, digital chips, or other applicable methods.

Figure 12:
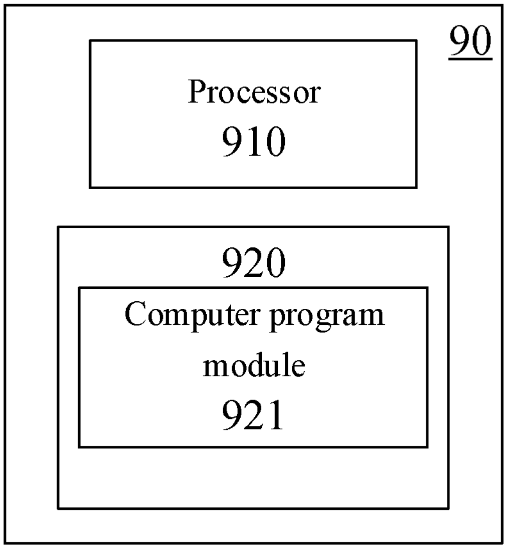
FIG. 12 is a schematic block diagram of another apparatus for video frame interpolation processing according to at least one embodiment of the present disclosure.

FIG. 12 is a schematic block diagram of another apparatus for video frame interpolation processing according to at least one embodiment of the present disclosure;

At least one embodiment of the present disclosure also provides an apparatus for video frame interpolation processing 90. As illustrated in FIG. 12, the apparatus for video frame interpolation processing 90 includes a processor 910 and a memory 920. The memory 920 includes one or more computer program modules 921. One or more computer program modules 921 are stored in the memory 920 and are configured to be executed by the processor 910. The one or more computer program modules 921 include instructions for executing the method for video frame interpolation processing 10 provided by at least one embodiment of the present disclosure, which, when executed by processor 910, can execute one or more steps of the method for video frame interpolation processing 10 provided by at least one embodiment of the present disclosure. The memory 920 and the processor 910 can be interconnected through a bus system and/or other forms of connection mechanisms (not shown).

For example, the processor 910 may be a central processing unit (CPU), a digital signal processor (DSP), or other forms of processing unit with data processing and/or program execution capabilities, such as a field programmable gate array (FPGA). For example, the central processing unit (CPU) can be an X86 or ARM architecture. The processor 910 can be a general-purpose processor or a specialized processor, which can control other components in the video frame interpolation processing apparatus 90 to perform the desired function.

For example, the memory 920 may include any combination of one or more computer program products, which may include various forms of computer-readable storage medium, such as a volatile memory and/or a non-volatile memory. The volatile memory may include, for example, a random-access memory (RAM) and/or a cache memory. The non-volatile memory may include, for example, a read-only memory (ROM), a hard disk, an erasable programmable read-only memory (EPROM), a portable compact disc read-only memory (CD-ROM), a USB memory, a flash memory, and the like. One or more computer program modules 921 can be stored on a computer-readable storage medium, and the processor 910 can run one or more computer program modules 921 to implement various functions of the video frame interpolation processing apparatus 90. In the computer-readable storage medium, various applications and data, as well as various data used and/or generated by applications, can also be stored. The specific functions and technical effects of the video frame interpolation processing apparatus 90 can be referred to the description of the video frame interpolation processing method 10 mentioned above, and will not be repeated here.

Figure 13:
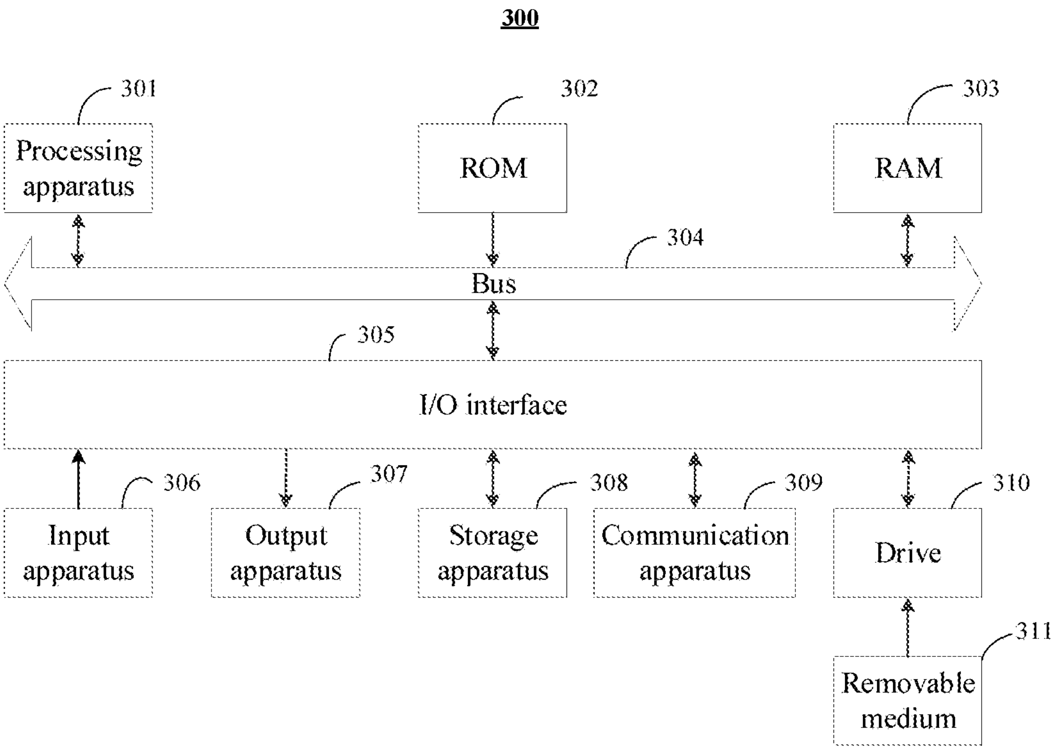
FIG. 13 is a schematic block diagram of still another apparatus for video frame interpolation processing according to at least one embodiment of the present disclosure.

FIG. 13 is a schematic block diagram of still another apparatus 300 for video frame interpolation processing according to at least one embodiment of the present disclosure;

The terminal device in the embodiments of the present disclosure may include, but is not limited to, a mobile terminal such as a mobile phone, a laptop, a digital broadcasting receiver, a PDA (personal digital assistant), a PAD (portable Android device), a PMP (portable multimedia player), a car terminal (e.g., car navigation terminal), and a fixed terminal such as the digital TV, a desktop computer, and the like. The video frame interpolation processing apparatus 300 illustrated in FIG. 13 is only an example and should not impose any limitations on the functionality and scope of use of the embodiments of the present disclosure.

For example, as illustrated in FIG. 13, in some examples, the video frame interpolation processing apparatus 300 includes a processing apparatus (e.g., central processing unit, graphics processor, etc.) 301, which can perform various appropriate actions and processes based on programs stored in the read-only memory (ROM) 302 or programs loaded from the storage apparatus 308 into the random-access memory (RAM) 303. In RAM 303, various programs and data required for the computer system operation are also stored. The processing apparatus 301, the ROM 302, and the RAM 303 are connected through the bus 304. The input/output (I/O) interface 305 is also connected to the bus 304.

For example, the following components may be connected to I/O interface 305: an input apparatus 306 including, for example, a touch picture, a touch pad, a keyboard, a mouse, a camera, a microphone, an accelerometer, a gyroscope, and the like; an output apparatus 307 including, for example, a liquid crystal display (LCD), a speaker, a vibrator, and the like; a storage apparatus 308 including, for example, a magnetic tape, a hard disk, and the like; and a communication apparatus 309 including, for example, a network interface card such as a LAN card, a modem, and the like. The communication apparatus 309 may allow the video frame interpolation processing apparatus 300 to communicate through the wired or wireless method with other devices to exchange data, and perform communication processing through a network such as the Internet. A drive 310 is also connected to the I/O interface 305 as needed. A removable medium 311, such as a disk, a CD-ROM, a magnetic disk, a semiconductor memory, and the like, are mounted to the drive 310 as needed to allow computer programs read therefrom to be mounted into the storage apparatus 308 as needed. Although FIG. 13 illustrates the video frame interpolation processing apparatus 300 including various apparatus, it should be understood that there is no requirement to implement or include all of the illustrated apparatus. More or fewer apparatus may alternatively be implemented or included.

For example, the video frame interpolation processing apparatus 300 may further include a peripheral interface (not shown), and the like. The peripheral interface may be of various types, such as a USB interface, a lighting interface, and the like. The communication apparatus 309 may communicate with networks and other devices through wireless communication, such as the Internet, an internal network, and/or a wireless network such as a cellular telephone network, a wireless local area network (LAN), and/or a metropolitan area network (MAN). The wireless communication may use any of various communication standards, protocols, and technologies, including but not limited to the global system for the global system for mobile communications (GSM), enhanced data GSM environment (EDGE), wideband code division multiple access (W-CDMA), code division multiple access (CDMA), time division multiple access (TDMA), Bluetooth, Wi-Fi (e.g., based on the IEEE 802. 11a, IEEE 802. 11b, IEEE 802. 11g, and/or IEEE 802. 11n standards), voice over internet protocol (VOIP), Wi-MAX, protocols for e-mail, instant messaging, and/or short message service (SMS), or any other suitable communication protocol.

For example, the video frame interpolation processing apparatus 300 can be any device such as a cell phone, a tablet computer, a laptop computer, an e-book, a game console, a television, a digital photo frame, a navigator, and the like, or any combination of the data processing device and hardware, and the embodiments of the present disclosure do not limit this.

For example, according to the embodiments of the present disclosure, the process described above with reference to the flowchart may be implemented as a computer software program. For example, the embodiments of the present disclosure include a computer program product that includes a computer program carried on a non-transient computer-readable medium, which includes program code for executing the method illustrated in the flowchart. In such embodiments, the computer program may be downloaded and installed from the network through the communication apparatus 309, or installed from the storage apparatus 308, or installed from ROM 302. When the computer program is executed by the processing apparatus 301, the video frame interpolation processing method 10 in the embodiments of the present disclosure is executed.

It should be noted that the computer-readable medium mentioned in the present disclosure may be a computer-readable signal medium, a computer-readable storage medium, or any combination thereof. The computer-readable storage medium can be, for example, but not limited to, a system, a device, or an apparatus of electricity, magnetism, light, electromagnetism, infrared, or semiconductors, or a combination of any of the above. More specific examples of computer-readable storage medium may include, but are not limited to: an electrical connection with one or more wires, a portable computer disk, a hard drive, a random-access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combination of the above. In the embodiments of the present disclosure, the computer-readable storage medium may be any tangible medium containing or storing a program, which may be used by or in combination with an instruction execution system, apparatus, or device. In the embodiments of the present disclosure, the computer-readable signal medium may include a data signal propagated in the baseband or as part of a carrier carrying the computer-readable program code. Such propagated data signals may take various forms, including but not limited to an electromagnetic signal, an optical signal, or any suitable combination of the above. The computer-readable signal medium may also be any computer-readable medium other than a computer-readable storage medium, which can send, propagate, or transmit a program for use by or in combination with an instruction execution system, apparatus, or device. The program code contained on computer-readable medium can be transmitted using any suitable medium, including but not limited to: a wire, an optical cable, RF (radio frequency), and the like, or any suitable combination of the above.

The computer-readable medium mentioned above can be included in the video frame interpolation processing apparatus 300. It can also exist separately without being assembled into the video frame interpolation processing apparatus 300.

Figure 14:
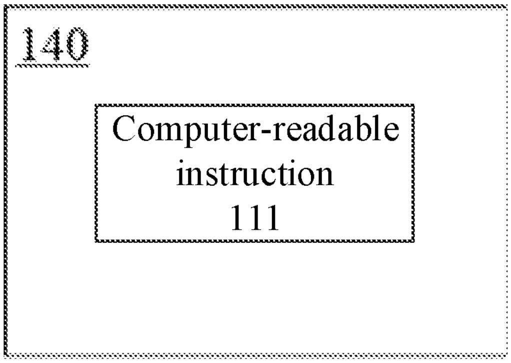
FIG. 14 is a schematic block diagram of a non-instantaneous readable storage medium according to at least one embodiment of the present disclosure.

FIG. 14 is a schematic block diagram of a non-instantaneous readable storage medium according to at least one embodiment of the present disclosure.

The embodiments of the present disclosure also provide a non-instantaneous readable storage medium. FIG. 14 is a schematic block diagram of a non-instantaneous readable storage medium according to at least one embodiment of the present disclosure. As illustrated in FIG. 14, a non-instantaneous readable storage medium 140 stores computer instructions 111, and the computer instructions 111 upon execution by a processor, cause the processor to execute one or more steps of method for the video frame interpolation processing 10 as described above when executed by the processor.

For example, the non-instantaneous readable storage medium 140 may be any combination of one or more computer-readable storage medium. For example, one computer-readable storage medium contains computer-readable program code for acquiring the first video frame and the second video frame of the video, another computer-readable storage medium contains computer-readable program code for acquiring the first comparison result between the first video frame and the second video frame based on the first video frame and the second video frame, and still another computer-readable storage medium contains the computer-readable program code for determining whether to interpolate frames between the first video frame and the second video frame based on the first comparison result. Of course, the above program codes can also be stored on the same computer-readable medium, and the embodiments in the present disclosure do not limit this.

For example, when the program code is read by the computer, the computer can execute the program code stored in the computer storage medium, such as the method for video frame interpolation processing 10 provided in any embodiment of the present disclosure.

For example, the storage medium may include a smart phone, a storage component of a tablet computer, a hard disk of a personal computer, a random-access memory (RAM), a read-only memory (ROM), an erasable programmable read-only memory (EPROM), a portable compact disk read-only memory (CD-ROM), a flash memory, or any combination of the above storage mediums, and may also be other applicable storage mediums. For example, the readable storage medium can also be the memory 920 of FIG. 12, and the relevant description can refer to the previous content, which will not be repeated here.

Figure 15:
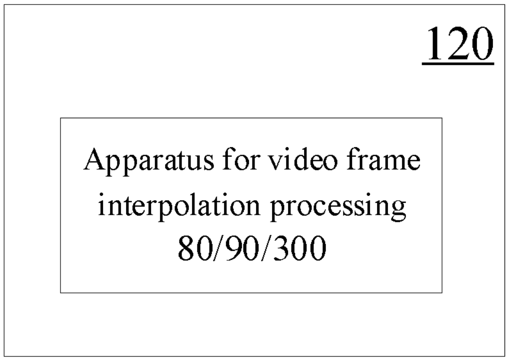
FIG. 15 is a schematic block diagram of an electronic device according to at least one embodiment of the present disclosure.

Embodiments of the present disclosure also provide an electronic device. FIG. 15 is a schematic block diagram of an electronic device according to at least one embodiment of the present disclosure. As illustrated in FIG. 15, the electronic device 120 may include a video frame interpolation processing apparatus 80/90/300 as described above. For example, the electronic device 120 may implement the method for video frame interpolation processing 10 provided in any one embodiment of the present disclosure.

In the present disclosure, the term "plurality" refers to two or more, unless otherwise specified.

After considering the disclosure of the specification and practices disclosed herein, those skilled in the art will easily come up with other implementation solutions disclosed herein. The present disclosure is intended to cover any variations, uses, or adaptive changes of the present disclosure, which follow the general principles of the present disclosure and include common knowledge or commonly used technical means in the technical field that are not disclosed in the present disclosure. The specification and embodiments are only considered exemplary, and the true scope and spirit of the present disclosure are indicated by the following claims.

It should be understood that the present disclosure is not limited to the precise structure described above and illustrated in the drawings, and various modifications and changes can be made without departing from its scope. The scope of the present disclosure is limited only by the accompanying claims.

What is claimed is:

1. A method for video frame interpolation processing, comprising:

acquiring a first video frame and a second video frame of a video, wherein the first video frame and the second video frame are adjacent temporally, and the first video frame is a forward frame of the second video frame;

acquiring a first comparison result between the first video frame and the second video frame based on the first video frame and the second video frame, wherein the first comparison result indicates whether a picture switch exists between the first video frame and the second video frame;

determining whether to interpolate a frame between the first video frame and the second video frame based on the first comparison result, setting a first frame interpolation flag; and in response to the picture switch existing between the first video frame and the second video frame, modifying the first frame interpolation flag to a second frame interpolation flag.

2. The method according to claim 1, wherein the picture switch comprises a subtitle switch and/or a scene switch.

3. The method according to claim 2, wherein the acquiring the first comparison result between the first video frame and the second video frame based on the first video frame and the second video frame, comprises:

determining whether the subtitle switch exists between the first video frame and the second video frame based on whether a subtitle content of the first video frame and a subtitle content of the second video frame are identical.

4. The method according to claim 3, wherein the determining whether the subtitle switch exists between the first video frame and the second video frame based on whether the subtitle content of the first video frame and the subtitle content of the second video frame are identical, comprises:

acquiring a first recognition text content of the first video frame;

acquiring a second recognition text content of the second video frame; and in response to the first recognition text content and the second recognition text content being identical, determining that the subtitle switch does not exist between the first video frame and the second video frame.

5. The method according to claim 2, wherein the acquiring the first comparison result between the first video frame and the second video frame based on the first video frame and the second video frame, comprises:

determining whether the scene switch exists between the first video frame and the second video frame based on whether a scene of the first video frame and a scene of the second video frame are identical.

6. The method according to claim 5, wherein the determining whether the scene switch exists between the first video frame and the second video frame based on whether the scene of the first video frame and the scene of the second video frame are identical, comprises:

acquiring a second similarity between the first video frame and the second video frame;

in response to the second similarity being greater than a second threshold, determining that the scene switch does not exist between the first video frame and the second video frame; and in response to the second similarity being not greater than the second threshold, determining that the scene switch exists between the first video frame and the second video frame.

7. The method according to claim 1, wherein the determining whether to interpolate a frame between the first video frame and the second video frame based on the first comparison result, comprises:

in response to the first comparison result indicating that the picture switch does not exist between the first video frame and the second video frame, determining to interpolate a frame between the first video frame and the second video frame; and in response to the first comparison result indicating that the picture switch exists between the first video frame and the second video frame, determining not to interpolate a frame between the first video frame and the second video frame.

8. The method according to claim 1, further comprising:

in response to the picture switch existing between the first video frame and the second video frame, acquiring a fourth video frame, wherein the fourth video frame and the second video frame are adjacent temporally, and the second video frame is a forward frame of the fourth video frame;

acquiring a second comparison result between the second video frame and the fourth video frame based on the second video frame and the fourth video frame, wherein the second comparison result indicates whether the picture switch exists between the second video frame and the fourth video frame; and determining whether to interpolate a frame between the second video frame and the fourth video based on the second comparison result.

9. The method according to claim 8, wherein the determining whether to interpolate a frame between the second video frame and the fourth video based on the second comparison result, comprises:

in response to the second comparison result indicating that the picture switch does not exist between the second video frame and the fourth video frame, interpolating a plurality of video frames between the second video frame and the fourth video frame, wherein a number of the plurality of video frames is based on the second frame interpolation flag.

10. The method according to claim 8, wherein the determining whether to interpolate a frame between the second video frame and the fourth video based on the second comparison result, comprises:

in response to the second comparison result indicating that the picture switch exists between the second video frame and the fourth video frame, determining not to interpolate a frame between the second video frame and the fourth video frame; and modifying the second frame interpolation flag to a third frame interpolation flag, wherein the third frame interpolation flag is used to indicate a number of frames to be interpolated next.

11. An apparatus for video frame interpolation processing, comprising:

a processor; and a memory, comprising one or more computer program modules, wherein the one or more computer program modules are stored in the memory and are configured to be executed by the processor, and the one or more computer program modules comprise instructions for executing the method for video frame interpolation processing according to claim 1.

12. A non-transitory readable storage medium storing computer instructions, wherein the computer instructions upon execution by a processor, cause the processor to execute the method for video frame interpolation processing according to claim 1.

13. An apparatus for video frame interpolation processing, comprising:

an acquisition module, configured to acquire a first video frame and a second video frame of a video, wherein the first video frame and the second video frame are adjacent temporally, and the first video frame is a forward frame of the second video frame;

a comparison module, configured to acquire a first comparison result between the first video frame and the second video frame based on the first video frame and the second video frame, wherein the first comparison result indicates whether a picture switch exists between the first video frame and the second video frame; and an operation module, configured to:

determine whether to interpolate a frame between the first video frame and the second video frame based on the first comparison result;

set a first frame interpolation flag; and in response to the picture switch existing between the first video frame and the second video frame, modify the first frame interpolation flag to a second frame interpolation flag.

* * * * *